W. S. WILLIS.
PEDAL SWITCH.
APPLICATION FILED OCT. 12, 1914.

1,158,355.

Patented Oct. 26, 1915.

WITNESSES
L. Hauerstein
A. L. Kitchin

INVENTOR
William S. Willis
BY Munn & Co
ATTORNEYS

UNITED STATES PATENT OFFICE.

WILLIAM STEPHEN WILLIS, OF NEW YORK, N. Y.

PEDAL-SWITCH.

1,158,355.  Specification of Letters Patent.  Patented Oct. 26, 1915.

Application filed October 12, 1914.  Serial No. 866,282.

*To all whom it may concern:*

Be it known that I, WILLIAM S. WILLIS, a citizen of the United States, and a resident of the city of New York, borough of Manhattan, in the county and State of New York, have invented a new and Improved Pedal-Switch, of which the following is a full, clear, and exact description.

This invention relates to improvements in signal devices for automobiles, and has for an object to provide an improved arrangement wherein signal lights will be lighted according to the movement, and also the proposed movement of the automobile.

Another object in view is to provide a row of lights at the rear of the automobile whereby the center light will indicate danger and the side lights will indicate the turning to the right or left, the same being associated with means whereby current is turned on for causing proper illumination of the respective lights.

Figure 1:
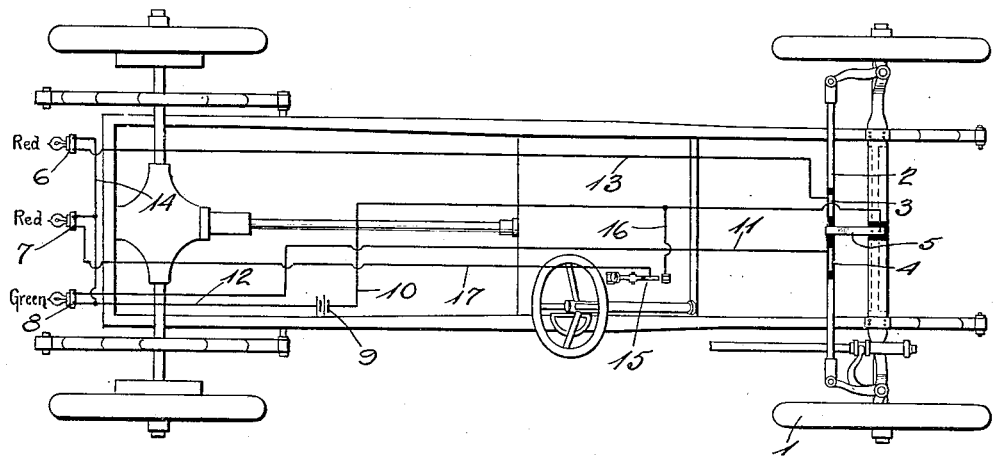
Figure 2:
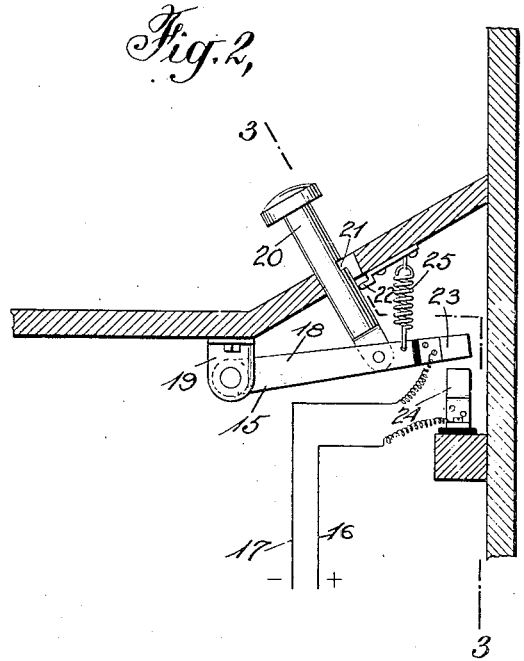
Figure 3:
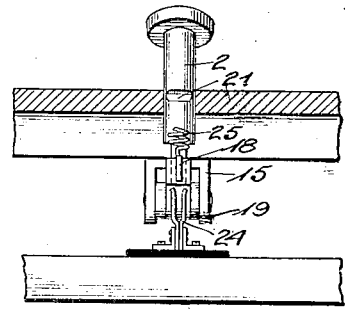

In the accompanying drawings—Figure 1 is a fragmentary top plan view of an automobile with a diagram embodying the invention applied thereto; Fig. 2 is an enlarged detailed fragmentary sectional view showing in side elevation a foot switch mechanism; Fig. 3 is a section through Fig. 2 approximately on line 3—3.

Referring to the accompanying drawings by numerals, 1 indicates an automobile of any desired kind provided with a transversely movable steering rod 2 which may be of ordinary construction.

Arranged on the steering rod 2 but insulated therefrom are contact members 3 and 4. Arranged on the front axle or any other suitable support is a contact member 5, which contact member is also insulated from its support. Contact member 5 may be a rigid stiff arm, but preferably it is flexible so as to have a continual pressure against the contacts 3 and 4 when moved into engagement therewith.

Arranged at the rear of the automobile are lights 6, 7 and 8, lights 6 and 7 being preferably red, while light 8 is preferably green.

A suitable source of current 9 which may be a battery or a dynamo is connected with the lamps as hereinafter fully described so that the same may be lighted under various conditions. When the automobile is turning to the right the green lamp 8 is lighted, while when turning to the left red light 6 will be lighted.

The lights 6 and 8 are near the opposite sides of the automobile so that their position may be readily seen while light 7 is arranged centrally, and if desired may be arranged above or below the other lights. The center light will naturally indicate a stop or danger.

In tracing the circuits of the various lamps it will be seen that when the automobile turns to the right contact 5 will engage contact 4 and current will pass from the source of current 9 to wire 10, and from thence to arm 5. From arm 5 the current will then pass through contact 4, wire 11, lamp 8, wire 12 back to the source of current. Light 8 will thus be maintained in a lighted condition as long as contacts 4 and 5 are in engagement. When the automobile is turning to the left contact 3 will move over and engage the contact arm 5, whereupon current will pass from the source of current 9 through wire 10, contact arm 5, contact 3, wire 13, lamp 6, wire 14, wire 12, back to the battery or source of current 9. When the automobile stops suddenly or for any reason it is desired to light the red light 7, the switch 15 is closed and current will pass from the source of current 9 through wire 10, wire 16, switch 15, wire 17, lamp 7, wire 14, wire 12, back to the battery or source of current. The switch 15 is operated manually so that the same may be easily actuated at any time. A suitable pedal is provided preferably near the usual pedals on the machine 1 so that no time may be lost in lighting lamp 7.

In order that the construction of switch 15 may be more clearly understood, reference is had to Figs. 2 and 3. From these figures it will be seen that the switch 15 is provided with an arm 18 pivotally mounted in a suitable bracket 19, said arm having pivotally connected therewith a pedal 20, which pedal is formed with a notch 21. Notch 21 may be caused to receive the catch or projection 22 rigidly secured to the front part of the bottom of the automobile. When catch 22 is in notch 21 arm 18 is held in a depressed position wherein the contact end 23 is in socket 24. A retractile spring 25 is connected with arm 18, and with the automobile so as to normally hold the parts as shown in Fig. 1. The wires 16 and 17 are connected with the socket 24, and with the contact 23, respectively. When the foot of the operator is placed upon pedal 20 the contact is closed and light 7 lighted, but the switch will automatically move to an open position under the action of spring 25 unless the operator pushes the pedal downwardly and forwardly a sufficient distance for causing catch 22 to project into notch 21, whereupon the switch will be locked in a closed position and lamp 7 will remain lighted continuously. Switch 15 is locked closed when the automobile is left standing so as to present a constant danger signal.

What I claim is—

In a switch mechanism for an automobile signal device, a socket, a knife pivotally mounted at a point spaced from said socket, said knife being adapted to have one end forced into said socket, an insulating member dividing said knife into parts so that the part engaging said socket will be insulated from the pivotal support of the knife, a spring for normally holding said knife out of engagement with said socket, a pedal pivotally connected with said socket between the insulation and the pivotal point of the knife, said pedal extending substantially at right angles to the knife, said pedal being formed with a notch, and a stationary catch arranged adjacent the pedal, said pedal being adapted to be moved pivotally toward said catch, whereby said catch will project into said notch when said knife is engaging said socket for locking the knife against movement.

In testimony whereof I have signed my name to this specification in the presence of two subscribing witnesses.

WILLIAM STEPHEN WILLIS.

Witnesses:
 LANSING F. WINNE,
 EDMUND D. VANDERBILT.